United States Patent [19]

Tamasho et al.

[11] Patent Number: 5,670,716
[45] Date of Patent: Sep. 23, 1997

[54] TIRE AIR PRESSURE DROP DETECTING SYSTEM

[75] Inventors: Tadashi Tamasho; Shuji Torii, both of Yokohama; Mitsuhiro Makita, Yokosuka, all of Japan

[73] Assignee: Nissan Motor Co., Ltd., Yokohama, Japan

[21] Appl. No.: 598,270

[22] Filed: Feb. 8, 1996

[30] Foreign Application Priority Data

Feb. 17, 1995 [JP] Japan .................................. 7-029735

[51] Int. Cl.⁶ .................................................. B60C 23/02
[52] U.S. Cl. .................................................. 73/146.2; 340/444
[58] Field of Search .............................. 73/146.2; 340/444

[56] References Cited

U.S. PATENT DOCUMENTS 5,218,862  6/1993  Hurrell et al. .................. 340/444 X
5,252,946  10/1993  Walker et al. ................. 73/146.2 X
5,513,523  5/1996  Sekiya et al. .................. 340/444 X

FOREIGN PATENT DOCUMENTS 6-8714  1/1994  Japan .

*Primary Examiner*—Richard Chilcot
*Assistant Examiner*—Joseph L. Felber
*Attorney, Agent, or Firm*—Foley & Lardner

[57] ABSTRACT

A system for use with an automotive vehicle supported on front and rear pairs of road wheels to detect a drop in a tire air pressure for each of the road wheels. When the vehicle is detected as operating substantially in a steady straight line driving condition, the road wheel having a dropped tire air pressure is specified based on the angular speeds of rotation of the respective road wheels. This detection is made based on the angular road wheel speeds in view of changes in loads exerted in the respective road wheels caused by the tire air pressure drop.

33 Claims, 8 Drawing Sheets

TIRE AIR PRESSURE DROP DETECTING SYSTEM

BACKGROUND OF THE INVENTION

This invention relates to a system for use with an automotive vehicle supported on front and rear pairs of road wheels to detect a drop in a tire air pressure for each of the road wheels.

The fact that the tire rolling radius is proportional to the tire air pressure has been utilized to detect a tire air pressure drop by a comparison of the tire rolling radii of the respective road wheels. As the tire air pressure drops, the tire rolling radius decreases. Since the angular speed of rotation of the road wheel having a dropped tire air pressure is greater than that of the road wheel having a normal tire air pressure, it is possible to specify one of the road wheels having a dropped tire air pressure by a comparison of the road wheel angular speeds detected by road wheel speed sensors used, for example, in an antiskid control unit.

Since the angular speed of rotation of the road wheel changes to a greater extent during vehicle acceleration deceleration or turning operation than when the tire air pressure drops, however, it is required to avoid mistaken detection of the road wheel having a dropped tire air pressure. For example, Japanese Patent Kokai No. 6--8714 proposes to correct the calculated road wheel speeds and/or tire air pressures based on the tire air pressure changes obtained experimentally or derived empirically for various vehicle operating conditions. However, this requires numerous and complex corrections and calculations causing mistaken tire air pressure detection because of correction timing errors. Furthermore, such tire air pressure drop detection cannot be used with other vehicle controls such as an antiskid control and the like because of elongated calculation time.

SUMMARY OF THE INVENTION

Therefore, a main object of the invention is to provide a simple and inexpensive tire air pressure drop detecting system which can ensure accurate specification of a road wheel having a dropped tire air pressure.

There is provided, in accordance with the invention, a system for use with an automotive vehicle supported on road wheels to detect a drop in a tire air pressure for each of the road wheels. The tire air pressures drop detecting system comprises sensor means for detecting angular speeds of rotation of the respective road wheels, and means for producing a command signal when the vehicle is detected as operating substantially in a steady straight line driving condition. The detection is made based on the detected angular road wheel speeds in view of changes in loads exerted in the respective road wheels caused by a drop in a tire air pressure for a road wheel. The tire air pressure drop detecting system also includes means responsive to the command signal for specifying the road wheel having a dropped tire air pressure based on the detected angular road wheel speeds.

The angular speeds of rotation of the respective road wheels are substantially at a certain predetermined value when the vehicle is moving in a steady straight line driving condition with all of the four road wheels having a normal tire air pressure. When one of the road wheels has a dropped tire air pressure, however, the loads exerted on the one road wheel and the road wheel positioned diagonally with respect to the one road wheel decrease and the loads exerted on the other two road wheels increase. The angular speeds of rotation of the road wheels having decreased loads exerted thereon decrease, whereas the angular speeds of rotation of the road wheels having increased loads exerted thereon increase. That is, the angular speeds of rotation of the respective road wheels changes according to changes in the loads exerted thereon. The fact that the vehicle is operating substantially in a steady straight line driving condition can be detected simply and correctly by a comparison of the angular road wheel speeds according to the angular road wheel speeds changes caused by the estimated changes in the loads exerted on the respective road wheels. The tire air pressure drop detection is made only when the vehicle is operating substantially in a steady straight line driving condition. It is, therefore, possible to ensure accurate tire air pressure drop detection for each of the road wheels without complex corrections and calculations.

The command signal producing means includes means for calculating a first ratio of the detected angular speeds of rotation of the front-left and -right road wheels, means for calculating a second ratio of the detected angular speeds of rotation of the rear-left and -right road wheels, and means for producing the command signal when an operation point represented by a coordinate pair of the first and second ratios is in a predetermined range having a first and second range. The first range expands ±d with respect to a first locus of change of the second ratio obtained with changes in the first ratio when the vehicle is operating in the steady straight line driving condition, where d is a small width, and the second range expands ±d with respect to a second locus of change of the first ratio obtained with changes in the second ratio when the vehicle is operating in the steady straight line driving condition. It is, therefore, possible to ensure accurate judgement whether the vehicle is operating substantially in a steady straight line driving condition.

The road wheel specifying means may include means for calculating a first ratio $P_F$ of the detected angular speeds of rotation of the front-left and -right road wheels, means for calculating a second ratio $P_R$ of the detected angular speeds of rotation of the rear-left and -right road wheels, and means for specifying the raod wheel having a dropped tire air pressure according to a position of an operation point represented by a coordinate pairs ($P_F$, $P_R$) with respect to a reference point represent by the coordinate pair ($P_F$, $P_R$) obtained when the vehicle is operating in the steady straight line driving condition. It is, therefore, possible to ensure accurate specification of the road wheel having a dropped tire air pressure.

The road wheel specifying means may include means for calculating a first difference between the first and second ratios, means for calculating a third ratio of the detected angular speeds of rotation of the front-left and rear-right road wheels, means for calculating a fourth ratio of the detected angular speeds of rotation of the front-right and rear-left road wheels, means for calculating a second difference between the third and fourth ratios, and means for specifying the road wheel having a dropped tire air pressure based on a comparison of the first difference with a first predetermined value and a comparison of the second difference with a second predetermined value. Alternatively, the road wheel specifying means may include means for calculating a third ratio of the detected angular speeds of rotation of the front-left and rear-right road wheels, means for calculating a fourth ratio of the detected angular speeds of rotation of the front-right and rear-left road wheels, means for calculating a first difference between the third and fourth ratios, means for calculating a fifth ratio of the detected angular speeds of rotation of the front-left and rear-left road wheels, means for calculating a sixth ratio of the detected angular speeds of rotation of the front-right and rear-light road wheels, means for calculating a second difference between the fifth and sixth ratios, means for calculating a second difference between the fifth and sixth ratios, and means for specifying the road wheel having a dropped tire air pressure based on a comparison of the first difference with a first predetermined value and a comparison of the second difference with a second predetermined value.

Preferably, the command signal producing means includes means for producing the command signal based on the angular speeds of rotation of the respective road wheels detected when the vehicle longitudinal acceleration is substantially at zero. With a differential limit device provided between the driving road wheels, the difference between the angular speeds of rotation of the driving road wheels decreases as the driving forces applied to the driving road wheels increases and vice versa when the driving force decreases. It is, therefore, possible to avoid mistaken tire air pressure drop detection by making the detection when the vehicle longitudinal acceleration is substantially at zero.

Preferably, the vehicle longitudinal acceleration detecting means includes means for calculating the vehicle longitudinal acceleration based on a differentiated value or difference for the detected angular speeds of rotation of the respective road wheels. It is, therefore, possible to eliminate the need for an additional longitudinal acceleration sensor so as to decrease the cost.

BRIEF DESCRIPTION OF THE DRAWINGS

The invention will be described in greater detail by reference to the following description taken in connection with the accompanying drawings, in which.

DETAILED DESCRIPTION OF THE INVENTION

Figure 1:
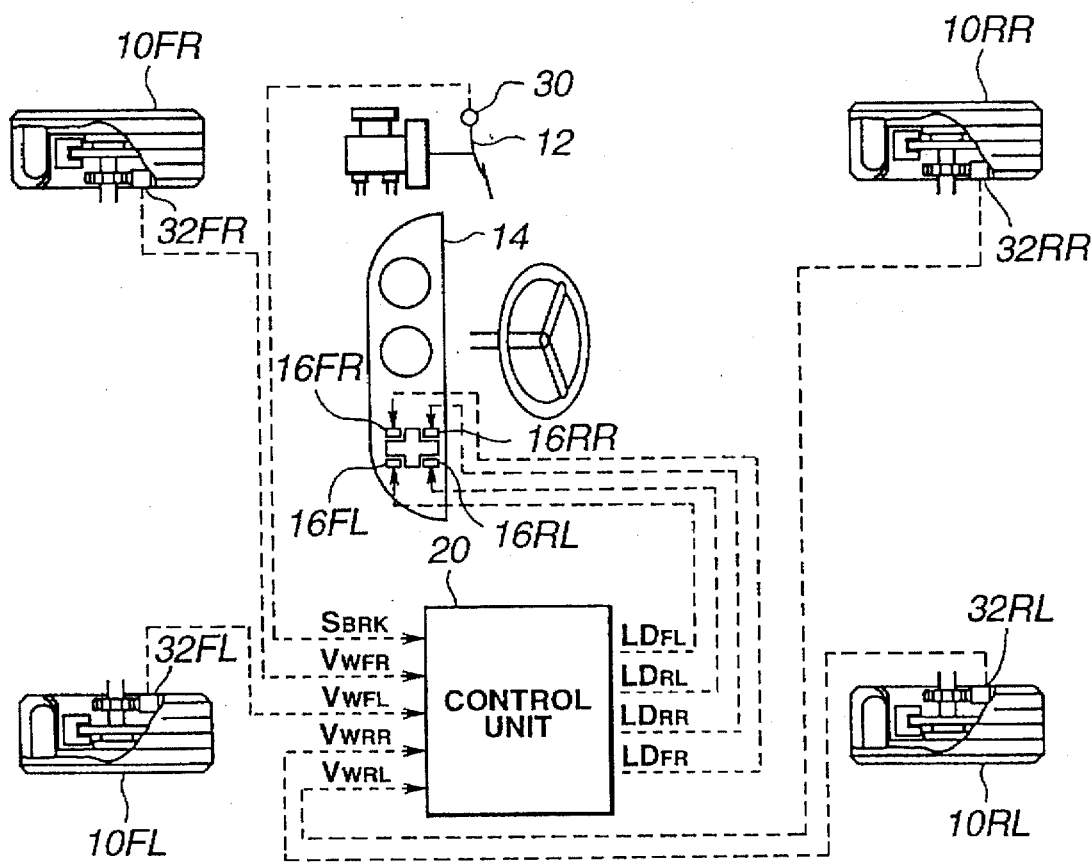
FIG. 1 is a schematic diagram showing one embodiment of a tire air pressure drop detecting system made in accordance with the invention.

With reference to the drawings, and in particular to FIG. 1, there is shown a schematic diagram of a tire air pressure drop detecting system applied to an automotive vehicle of the front drive type supported on front-left and -right driving road wheels 10FL and 10FR and rear-left and -right driven road wheels 10RL and 10RR. The numeral 12 designates a brake pedal depressed for application of brakes to the road wheels. Lamps 16FL, 16FR, 16RL and 16RR are provided on the instrument panel 14 of the vehicle. Each of the lamps 16FL, 16FR, 16RL and 16RR operates on a corresponding one of drive signals $LD_{FL}$, $LD_{FR}$, $LD_{RL}$, and $LD_{RR}$ fed thereto from a control unit 20 to provide a visible indication. The control unit 20 receives an input from a brake switch 30. The brake switch 30 is associated with the brake pedal 12 and it produces a brake signal $S_{BRK}$ which has a high or logic "1" level when the brake pedal 12 is depressed and a low or logic "0" level when the brake pedal 12 is released. The control unit 20 also receives inputs from road wheel speed sensors 32FL, 32FR, 32RL and 32RR. The road wheel speed sensors 32FL, 32FR, 32RL and 32RR are provided to sense the angular speeds of rotation of the respective road wheels 10FL, 10FR, 10RL and 10RR and they produce sensor signals $V_{WFL}$, $V_{WFR}$, $V_{WRL}$ and $V_{WRR}$ indicative of the sensed angular road wheel speeds. It is to be understood that the term "angular road wheel speed" is equivalent to the term "road wheel speed" when the tire rolling radius is constant. Each of the road wheel speed sensors 32FL, 32FR, 32RL and 32RR may be of the type including an electrical coil which has an alternative voltage generated across its terminals as a result of changes in magnetic flux in its magnetic circuit including a magnet facing to a serrated magnetic rotor associated for rotation with rotation of the corresponding road wheel.

Figure 2:
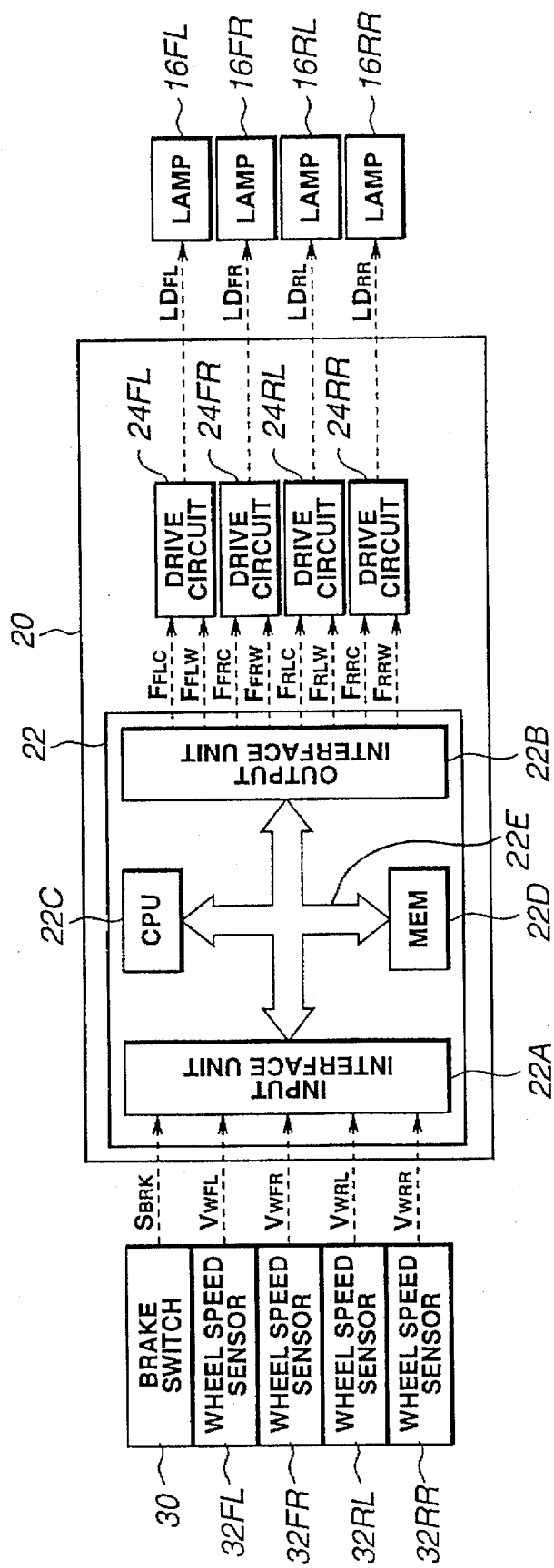
FIG. 2 is a block diagram showing the control unit used in the tire air pressure drop detecting system of FIG. 1.

Referring to FIG. 2, the control unit 20 employs a digital computer 22 which includes an input interface 22A, an output interface 22B, a central processing unit (CPU) 22C and a memory (MEM) 22D. The central processing unit 22C communicates with the rest of the computer via data bus 22E. The input interface 22A includes waveform shapers provided for the sensor signals $V_{WFL}$, $V_{WFR}$, $V_{WRL}$ and $V_{WRR}$ fed thereto from the respective road wheel speed sensors 32FL, 32FR, 32RL and 32RR, and an A/D converter for converting the shaped signals into digital form for application to the central processing unit 22C. The memory 22D contains programs for operating the central processing unit 22C and further contains appropriate data used in detecting drops in the tire air pressures for the respective road wheel 10FL, 10FR, 10RL and 10RR. The detected tire air pressure drops are transferred by the central processing unit 22C to the output interface 22B which converts them into caution control signals $F_{ic}$ ($F_{FLC}$, $F_{FRC}$, $F_{RLC}$ and $R_{RRC}$) or warning control signals $F_{iW}$ ($F_{FLW}$, $F_{FRW}$, $F_{RLW}$ and $F_{RRW}$). The caution or warning control signals are applied to drive circuits 24FL, 24FR, 24RL and 24RR which convert them into drive signals $LD_{FL}$, $LD_{FR}$, $LD_{RL}$, and $LD_{RR}$ for application to the respective lamps 16FL, 16FR, 16RL and 16RR. The lamps 16FL, 16FR, 16RL and 16RR operate to flash when the corresponding caution control signals $F_{FLC}$, $F_{FRC}$, $F_{RLC}$ and $F_{RRC}$ have a high or logic "1" level and to go on when the corresponding warning control signals $F_{FLW}$, $F_{FRW}$, $F_{RLW}$ and $F_{RRW}$ have a high or logic "1" level. Each of the drive circuits 24FL, 24FR, 24RL and 24RR includes a sample and hold circuit which maintains the drive signal to the corresponding lamp until the caution or warning control signal is switched.

Figure 3A:
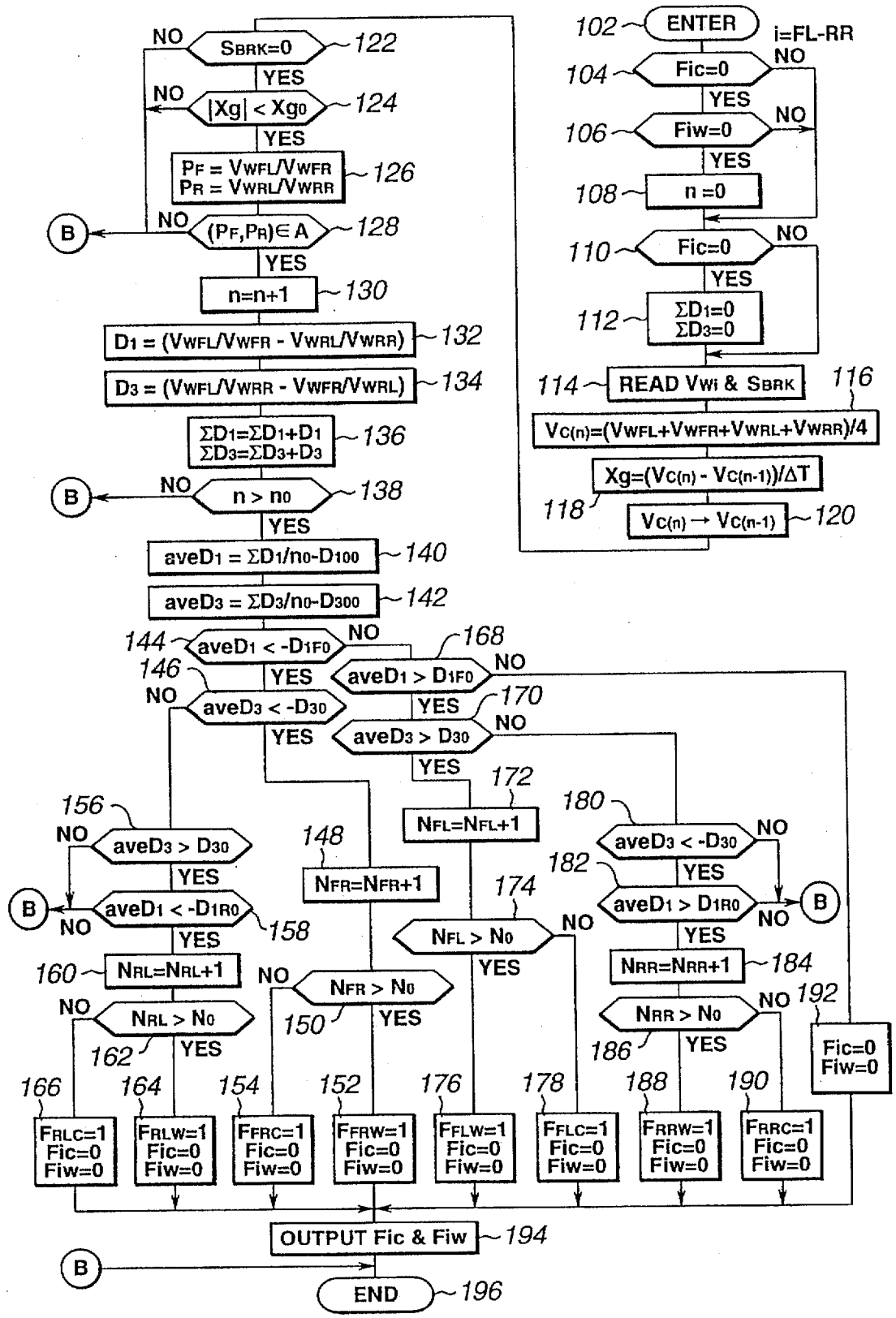
FIG. 3a is a flow diagram illustrating the programming of the digital computer as it is used to produce the caution or warning control signals.

FIG. 3a is a flow diagram illustrating the programming of the digital computer as it is used to produce the caution or warning control signals. The computer program is entered at the point 102 at uniform intervals of time $\Delta T$, for example, 5 msec. At the point 104 in the program, a determination is made as to whether or not all of the caution control signals $F_{iC}$ have a low or logic "0" level. If the answer to this question is "yes", then the program proceeds to the point 106. Otherwise, the program proceeds to the point 110. At the point 106 in the program, a determination is made as to whether or not all of the warning control signals $F_{iW}$ have a low or logic "0" level. If the answer to this question is "yes", then the program proceeds to the point 108. Otherwise, the program proceeds to the point 110. At the point 108, the count n of a cumulative wheel speed ratio counter is cleared to zero. Following this, the program proceeds to the point 110.

At the point 110 in the program, a determination is made as to whether or not a count n of the cumulative wheel speed ratio counter has been cleared to zero. If the answer to this question is "yes", then the program proceeds to the point 112. Otherwise, the program proceeds to the point 114. At the point 112 in the program, the cumulative value $\Sigma D1$ of the difference D1 of the rear-left and rear-right wheel speed ratio from the front-left and front-right wheel speed ratio is cleared to zero and the cumulative value $\Sigma D3$ of the difference D3 of the front-right and rear-left wheel speed ratio from the front-left and rear-right wheel speed ratio is cleared to zero. Following this, the program proceeds to the point 114.

At the point 114 in the program, the wheel speed indicative signals $V_{Wi}$ ($V_{WFL}$, $V_{WFR}$, $V_{WRL}$ and $V_{WRR}$) and the brake signal $S_{BRK}$ are read into the computer memory 22D. At the point 116 in the program, the read wheel speeds $V_{Wi}$ ($V_{WFL}$, $V_{WFR}$, $V_{WRL}$ and $V_{WRR}$) are used to calculate the new average wheel speed value $V_{c(n)}$ as:

$$V_{c(n)}=(V_{WFL}+V_{WFR}+V_{WRL}+V_{WRR})/4 \tag{1}$$

At the point 118 in the program, a variable indicating vehicle longitudinal acceleration, Xg, is calculated as a function of the new and last averaged wheel speed value $V_{c(n)}$ and $V_{c(n-1)}$ as:

$$Xg=(V_{c(n)}-V_{c(n-1)})/\Delta T \tag{2}$$

At the point 120 in the program, the new averaged wheel speed value $V_{c(n)}$ is used to update the last averaged wheel speed value $V_{c(n-1)}$ stored in the computer memory 22D. At the point 122 in the program, a determination is made as to whether or not the read brake signal $S_{BRK}$ has a low or logic "0" level. If the answer to this question is "yes", then the program proceeds to the point 124. Otherwise, the program proceeds to the end point 196. At the point 124 in the program, a determination is made as to whether or not the absolute value |Xg| of the vehicle longitudinal acceleration Xg is less than a predetermined value $Xg_0$. If the answer to this question is "yes", then the program proceeds to the point 126. Otherwise, the program proceeds to the end point 196. At the point 126 in the program, the ratio $P_F$ of the front-left wheel speed to the front-right wheel speed and the ratio $P_R$ of the rear-left wheel speed to the rear-right wheel speed are calculated as:

$$P_F=V_{WFL}/V_{WFR} \tag{3}$$

$$P_R=V_{WRL}/V_{WRR} \tag{4}$$

Figure 4:
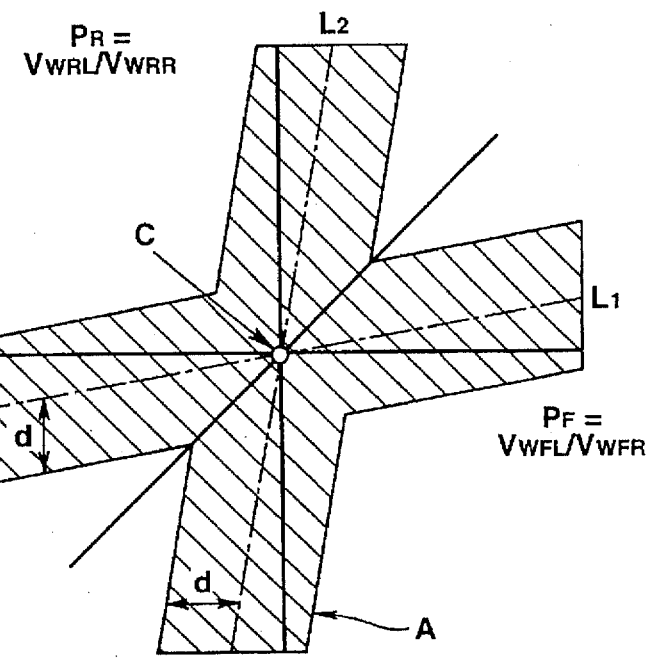
FIG. 4 is a diagram used in explaining a predetermined range for the operating point where the vehicle is operating substantially in a steady straight line driving condition.

At the point 128 in the program, a determination is made as to whether or not the data point represented as coordinate pairs ($P_F$, $P_R$) is in a predetermined range A to be described later in connection with FIG. 4. If the answer to this question is "yes", then the program proceeds to the point 130. Otherwise, the program proceeds to the end point 196. At the point 130, the count n of the cumulative wheel speed ratio counter is incremented. At the point 132 in the program, the difference D1 of the rear-left and rear-right wheel speed ratio from the front-left and front-right wheel speed ratio is calculated as:

$$D1=V_{WFL}/V_{WFR}-V_{WRL}/V_{WRR} \tag{5}$$

At the point 134 in the program, the difference D3 of the front-right and rear-left wheel speed ratio from the front-left and rear-right wheel speed ratio is calculated as:

$$D3=V_{WFL}/V_{WRR}-V_{WFR}/V_{WRL} \tag{6}$$

At the point 136 in the program, the cumulative value $\Sigma D1$ of the difference D1 of the rear-left and rear-right wheel speed ratio from the front-left and front-right wheel speed ratio and the cumulative value '$D3$ of the difference D3 of the front-right and rear-left wheel speed ratio from the front-left and rear-right wheel speed ratio are calculated as:

$$\Sigma D1=\Sigma D1+D1 \tag{7}$$

$$\Sigma D3=\Sigma D3+D3 \tag{8}$$

At the point 138 in the program, a determination is made as to whether or not the count n of the cumulative wheel speed ratio counter is greater than a predetermined value $n_0$. If the answer to this question is "yes", then the program proceeds to the point 140. Otherwise, the program proceeds to the end point 196. At the point 140 in the program, the average value aveD1 is calculated as:

$$aveD1=\Sigma D1/n_0-D_{100} \tag{9}$$

where $D_{100}$ is the initial value of the difference D1 of the rear-left and rear-right wheel speed ratio from the front-left and front-right wheel speed ratio. At the point 142 in the program, the average value aveD3 is calculated as:

$$aveD3=\Sigma D3/n_0-D_{300} \tag{10}$$

where $D_{300}$ is the initial value of the difference D3 of the front-right and rear-left wheel speed ratio from the front-left and rear-right wheel speed ration. At the point 144 in the program, a determination is made as to whether or not the average value aveD1 is less than a predetermined negative value $-D_{IFO}$. If the answer to this question is "yes", then the program proceeds to the point 146. Otherwise, the program proceeds to the point 168.

At the point 146 in the program, a determination is made as to whether or not the average value aveD3 is less than a predetermined negative value $-D_{30}$. If the answer to this question is "yes", then the program proceeds to the point 148. Otherwise, the program proceeds to the point 156. At the point 148 in the program, the count $N_{FR}$ of a front-right wheel air pressure caution counter is incremented. Following this, the program proceeds to a determination step at the point 150. This determination is as to whether or not the count $N_{FR}$ is greater than a predetermined value $N_0$. If the answer to this question is "yes", then the program proceeds to the point 152 where a command is produced to change the warning control signal $F_{FRW}$ to its high or logic "1" level. The other control signals $F_{FLW}$, $F_{RLW}$, $F_{RRW}$, $F_{FLC}$, $F_{FRC}$, $F_{RLC}$ and $F_{RRC}$ are maintained at the low or logic "0" level. If the count $N_{FR}$ is equal to or less than the predetermined value $N_0$, then the program proceeds to the point 154 where a command is produced to change the caution control signal $F_{FRC}$ to its high or logic "1" level. The other control signals $F_{FRW}$, $F_{FLW}$, $F_{RLW}$, $F_{RRW}$, $F_{FLC}$, $F_{RLC}$ and $F_{RRC}$ are maintained at the low or logic "0" level.

At the point 156 in the program, a determination is made as to whether or not the average value aveD3 is greater than the predetermined value $D_{30}$. If the answer to this question is "yes", then the program proceeds to the point 158. Otherwise, the program proceeds to the end point 196. At the point 158 in the program, a determination is made as to whether or not the average value aveD1 is less than a predetermined negative value $-D_{IRO}$. If the answer to this question is "yes", then the program proceeds to the point 160. Otherwise, the program proceeds to the end point 196. At the point 160 in the program, the count $N_{RL}$ of a rear-left wheel air pressure caution counter is incremented. Following this, the program proceeds to a determination step at the point 162. This determination is as to whether or not the count $N_{FR}$ is greater than the predetermined value $N_0$. If the answer to this question is "yes", then the program proceeds to the point 164 where a command is produced to change the warning control signal $F_{RLW}$ to its high or logic "1" level. The other control signals $F_{FLW}$, $F_{FRW}$, $F_{RRW}$, $F_{RLC}$, $F_{FRC}$, $F_{RLC}$ and $F_{RRC}$ are maintained at the low or logic "0" level. If the count $N_{RL}$ is equal to or less than the predetermined value $N_0$, then the program proceeds to the point 166 where a command is produced to change the caution control signal $F_{RLC}$ to its high or logic "1" level. The other control signals $F_{FRW}$, $F_{FLW}$, $F_{RLW}$, $F_{RRW}$, $F_{FLC}$, $F_{FRC}$ and $F_{RRC}$ are maintained at the low or logic "0" level.

At the point 168 in the program, a determination is made as to whether or not the average value aveD1 is greater than the predetermined negative value $D_{IFO}$. If the answer to this question is "yes", then the program proceeds to the point 170. Otherwise, the program proceeds to the point 192.

At the point 170 in the program, a determination is made as to whether or not the average value aveD3 is greater than the predetermined negative value $D_{30}$. If the answer to this question is "yes", then the program proceeds to the point 172. Otherwise, the program proceeds to the point 180. At the point 172 in the program, the count $N_{FL}$ of a front-left wheel air pressure caution counter is incremented. Following this, the program proceeds to a determination step at the point 174. This determination is as to whether or not the count $N_{FL}$ is greater than the predetermined value $N_0$. If the answer to this question is "yes", then the program proceeds to the point 176 where a command is produced to change the warning control signal $F_{FLW}$ to its high or logic "1" level.

The other control signals $F_{FRW}$, $F_{RLW}$, $F_{RRW}$, $F_{FLC}$, $F_{FRC}$, $F_{RLC}$ and $F_{RRC}$ are maintained at the low or logic "0" level. If the count $N_{FL}$ is equal to or less than the predetermined value $N_0$, then the program proceeds to the point 178 where a command is produced to change the caution control signal $F_{FLC}$ to its high or logic "1" level. The other control signals $F_{FRW}$, $F_{FLW}$, $F_{RLW}$, $F_{RRW}$, $F_{FRC}$, $F_{RLC}$ and $F_{RRC}$ are maintained at the low or logic "0" level.

At the point 180 in the program, a determination is made as to whether or not the average value aveD3 is greater than the predetermined negative value $-D_{30}$. If the answer to this question is "yes", then the program proceeds to the point 182. Otherwise, the program proceeds to the end point 196. At the point 182 in the program, a determination is made as to whether or not the average value aveD1 is greater than the predetermined value $D_{IRO}$. If the answer to this question is "yes", then the program proceeds to the point 184. Otherwise, the program proceeds to the end point 196. At the point 184 in the program, the count $N_{RR}$ of a rear-right wheel air pressure caution counter is incremented. Following this, the program proceeds to a termination step at the point 186. This determination is as to whether or not the count $N_{RR}$ is greater than the predetermined value $N_0$. If the answer to this question is "yes", then the program proceeds to the point 188 where a command is produced to change the warning control signal $F_{RRW}$ to its high or logic "1" level. The other control signals $F_{FLW}$, $F_{FRW}$, $F_{RLW}$, $F_{FLC}$, $F_{FRC}$, $F_{RLC}$ and $F_{RRC}$ are maintained at the low or logic "0" level. If the count $N_{RR}$ is equal to or less than the predetermined value $N_0$, then the program proceeds to the point 190 where a command is produced to change the caution control signal $F_{RRC}$ to its high or logic "1" level. The other control signals $F_{FRW}$, $F_{FLW}$, $F_{RLW}$, $F_{RRW}$, $F_{FLC}$, $F_{FRC}$ and $F_{RCL}$ are maintained at the low or logic "0" level.

At the point 192 in the program, all of the control signals $F_{FLC}$, $F_{FRC}$, $F_{RLC}$, $F_{RR}$, $F_{FLW}$, $F_{FRW}$, $F_{RLW}$ and $F_{RRW}$ are maintained at the low or logic "0" level. At the point 194, the control signals $F_{FLC}$, $F_{FRC}$, $F_{RLC}$, $F_{RR}$, $F_{FLW}$, $F_{FRW}$, $F_{RLW}$ and $F_{RRW}$ are produced to the corresponding drive circuits 24FL, 24FR, 24RL and 24RR. Following this, the program proceeds to the end point 196.

The caution control signals $F_{FLC}$, $F_{FRC}$, $F_{RLC}$ and $F_{RR}$ and the warning control signals $F_{FLW}$, $F_{FRW}$, $F_{RLW}$ and $F_{RRW}$ are initialized to the low or logic "0" level, the cumulative values $\Sigma D1$ and $\Sigma D3$ are cleared to zero, the counts n and Ni of the cumulative counters are cleared to zero, for example, when the ignition switch is turned on again.

The operation is as follows: FIG. 4 illustrates the predetermined range A used in the determination step at the point 128 of FIG. 3. In FIG. 4, the predetermined range A is indicated by the hatched area of FIG. 4. The operation point, which is represented in a Cartesian coordinate system having a horizontal ($P_F = V_{WFL}/V_{WFR}$) and vertical ($P_R = V_{WRL}/V_{WRR}$) axis, will be in agreement with the reference point C if the vehicle is running under a steady straight line driving condition, that is, when the tire air pressure for each of the four road wheels 10FL, 10FR, 10RL and 10RR is held at a normal level to ensure a stable tire rolling radius, when the road surface is stable to ensure application of stable driving forces (acceleration forces) to the respective driving road wheels 10FL and 10FR and also application of stable engine braking forces (deceleration forces) to the driving road wheels 10FL and 10FR, and when no braking forces are exerted through the associated wheel cylinders. With a drop in the tire air pressure for one of the four road wheels 10FL, 10FR, 10RL and 10RR, the rolling radius of the one road wheel will decrease to decrease the load exerted on the one road wheel and the load exerted on the road wheel positioned diagonally with respect to the one road wheel and increase the loads exerted on the other diagonal road wheels, causing the operation point ($P_F$, $P_R$) to shift from the reference point C.

Assuming now that the tire air pressure for the front-left road wheel 10FL decreases, the angular speed of rotation of the front-left road wheel 10FL (front-left wheel speed) $V_{WFL}$ will increase to increase the ratio $P_F$. At the same time, the load exerted on the rear-right road wheel 10RR decreases to decrease the rear-right wheel speed $V_{WRR}$ and the load exerted on the rear-left road wheel 10RL increase to increase the rear-left wheel speed $V_{WRL}$ so that the ratio $P_R$ increases. As a result, the operation point ($P_F$, $P_R$) shifts to the upper right, as viewed in FIG. 4, from the reference point C. If the tire air pressure for the front-right road wheel 10FR decreases, the angular speed of rotation of the front-right road wheel 10FR (front-write wheel speed) $V_{WFR}$ will increase to decrease the ratio $P_F$. At the same time, the load exerted on the rear-left road wheel 10RL decreases to decrease the rear-left wheel speed $V_{WRL}$ and the load exerted on the rear-right road wheel 10RR increases to increase the rear-left wheel speed $V_{WRR}$ so that the ratio $P_R$ decreases. As a result, the operation point ($P_F$, $P_R$) shifts to the lower left, as viewed in FIG. 4, from the reference point C. It is, therefore, apparent that the operation point ($P_F$, $P_R$) shifts on a line L1 in response to a decrease in the tire air pressure for either of the front road wheels 10FL and 10FR when the vehicle is running under a steady straight line driving condition. Similarly, the operation point ($P_F$, $P_R$) shifts on a line L2 in response to a decrease in the tire air pressure for either of the rear road wheels 10RL and 10RR when the vehicle is running under a steady straight line driving condition. The changes in the angular speed of rotation of the road wheels (road wheel speeds) caused by changes in the loads exerted thereon are small as compared to the changes in the angular speed of rotation of the road wheel (road wheel speed) for which the tire air pressure is decreased so that an increase in one of the ratios $P_F$ and $P_R$ results in a very small increase in the other ratio according to the suspension and tire spring constants and vehicle body rigidity. A similar tendency is obtained also when the ratios $P_F$ and $P_R$ are represented as $P_F=V_{WFR}/V_{WFL}$ and $P_R=V_{WRR}/V_{WRL}$. Thus, it can be said that the vehicle is running substantially under a steady straight line driving condition when the operation point ($P_F$, $P_R$) is in the predetermined range A, that is, when the operation point ($P_F$, $P_R$) is in a first range expanding ±d with respect to the line L1 or in a second range expanding ±d with respect to the line L2 where d is a predetermined small width.

According to the invention, therefore, the tire air pressure drop detection is made when the vehicle is running substantially under a steady straight line driving condition. This is effective to eliminate the complicated corrections required in calculating the tire air pressure and improve the accuracy with which the tire air pressure drop is detected.

Preferably, the control unit is arranged to allow the tire air pressure drop detection when the drive load wheels 10FL and 10FR have no great acceleration or deceleration forces exerted thereon in the absence of vehicle braking. That is the tire air pressure drop detection is made when the brake signal $S_{BRK}$ has a low or logic "0" (point 122 of the program of FIG. 3) and when the absolute value |Xg| of the vehicle longitudinal acceleration Xg is less than a predetermined value $Xg_0$ (point 124 of the program of FIG. 3). This is effective to improve the accuracy of detection of the tire air pressure drop. With the use of a differential limit device provided between the left and right driving road wheels (in the illustrated case road wheels 10FL and 10FR), the judgement whether or not the operation point ($P_F$, $P_R$) is in the predetermined range A becomes unclear because the differential limit device tends to decrease the difference between the angular speeds of rotation of the left and right driving road wheels when great driving forces are applied to the driving wheels and also the accuracy with which the road wheel having its tire air pressure dropped is specified is decreased because of variations in the difference D1 of the rear-left and rear-right wheel speed ratio from the front-left and front-right wheel speed ratio and in the difference D3 of the front-right and rear-left wheel speed ratio from the front-left and rear-right wheel speed ratio. It is possible to avoid these problems by allowing the tire air pressure drop detection when the vehicle longitudinal acceleration is substantially zero.

If the braking forces exerted uniformly on the four road wheels in the presence of vehicle braking, the angular speeds of rotation of the respective road wheels will decreases at the same rate. For example, the operation point ($P_F$, $P_R$) is constant substantially under a steady straight line driving condition regardless of vehicle braking. In practice, however, the braking forces applied to the respective road wheels are not uniform and dependent on the road surface conditions and the loads exerted on the respective road wheels. It is better to improve the accuracy of detection of the tire air pressure drop by preventing the tire air pressure drop detection when the brake signal $S_{BRK}$ has a high or logic "1" level.

The cumulative value $\Sigma D1$ of the difference D1 of the rear-left and rear-right wheel speed ratio from the front-left and front-right wheel speed ratio and the cumulative value $\Sigma D3$ of the difference D3 of the front-right and rear-left wheel speed ratio from the front-left and rear-right wheel speed ratio are calculated. The average value aveD1 is calculated as aveD1=$\Sigma D1/n_0-D_{100}$ and the average value aveD3 is calculated as aveD3=$\Sigma D3/n_0-D_{300}$. These average values aveD1 and aveD3 are used to specify the road wheel having its tire air pressure dropped. This is effective to preclude such a danger that a temporary wheel speed change has an effect on the accuracy with which the tire air pressure drop is detected.

Figure 5:
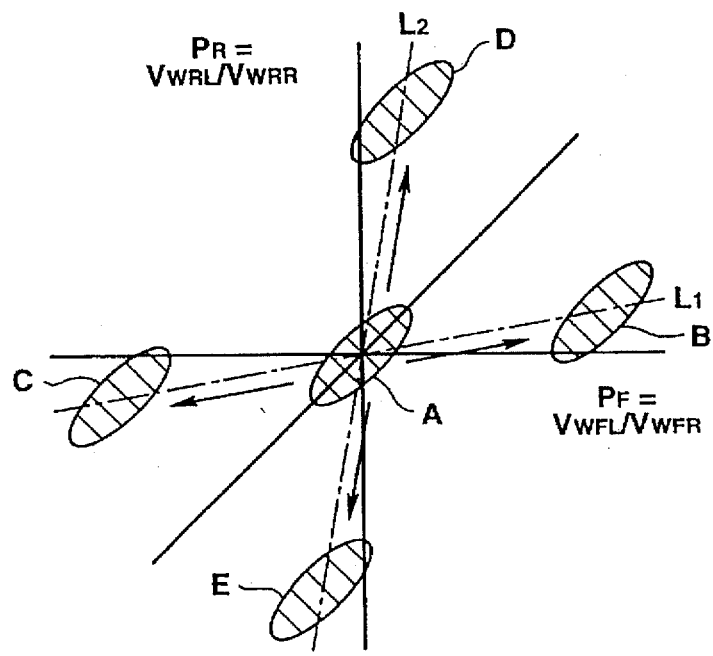
FIG. 5 is a diagram used in explaining changes in the position of the operation point.
Figure 6:
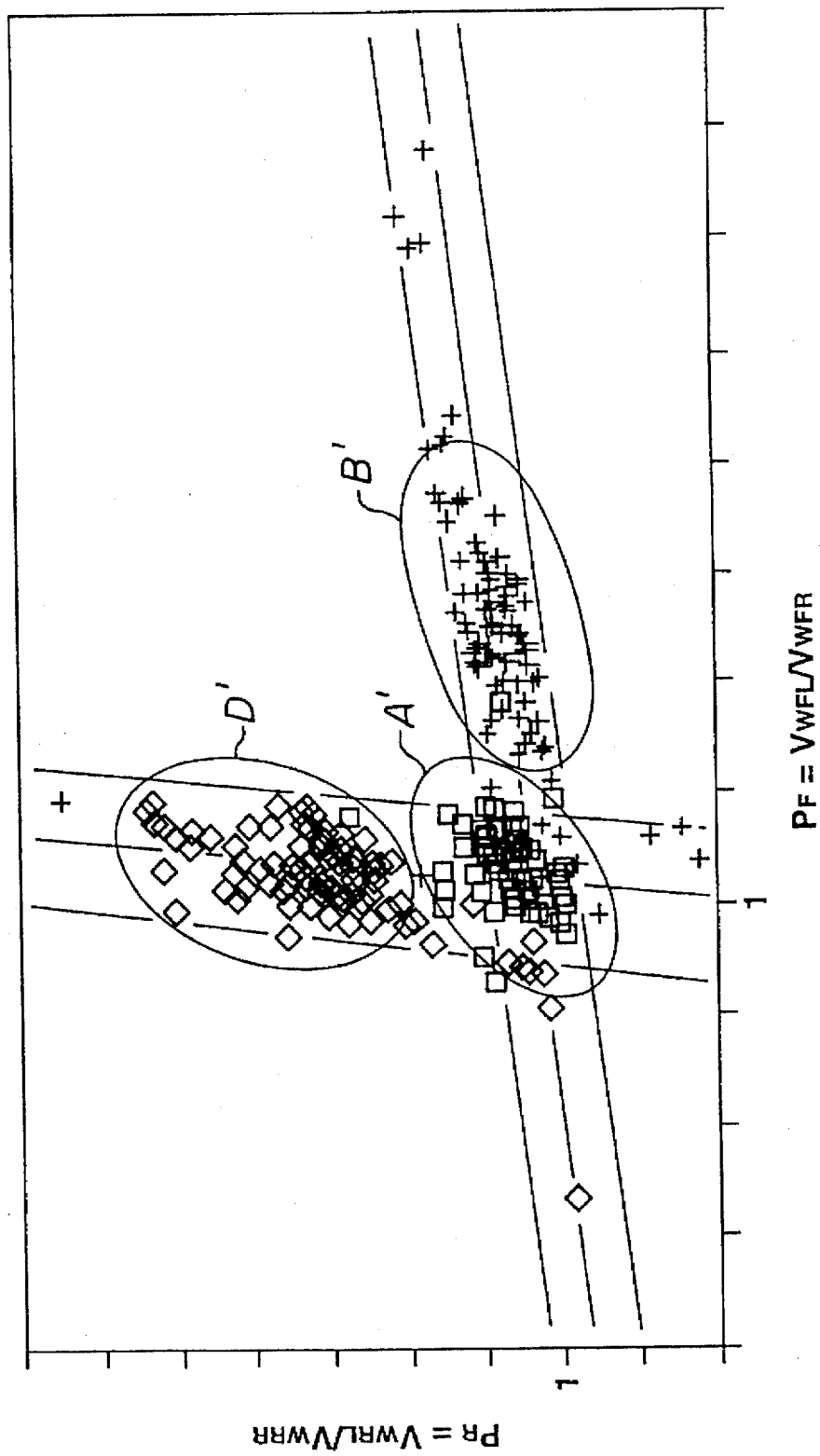
FIG. 6 is a diagram showing test results used in explaining operation point position changes resulting from tire air pressure drops for the respective road wheels.

As shown in FIG. 5, the ratios $P_F$ and $P_R$ are interrelative. When the vehicle is running substantially under a steady straight line driving condition with all of the four road wheels having a normal tire air pressure, the operation point ($P_F$, $P_R$) is placed in the hatched area A around the reference point C. The operation point ($P_F$, $P_R$) shifts rightward, as indicated by the hatched area B of FIG. 5, with a decrease in the tire air pressure for the front-left road wheel 10FL, leftward, as indicated by the hatched area C of FIG. 5, with a decrease in the tire air pressure for the front-right road wheel 10FR, upward, as indicated by the hatched area D of FIG. 5, with a decrease in the tire air pressure for the rear-left road wheel 10RL, and downward, as indicated by the hatched are E of FIG. 5, with a decrease in the tire air pressure for the rear-right road wheel 10RR. This was proven through our experiments. The experiment results are shown in FIG. 6 where the character □ indicates the case where all of the four road wheels have a normal tire air pressure, the character +indicates the case where the front-left road wheel has a dropped tire air pressure, and the character ◊ indicates the case where the rear-left road wheel has a dropped tire air pressure. Referring now to FIG. 5 and FIG. 6, most of the □ characters fall within the region A', which corresponds to region A; most of the ◊ characters fall within the region D', which corresponds to region D; and most of the + characters fall within the region B', which corresponds to region B. Thus, the experimental results substantially validate the theoretical results.

Description is made to the difference D1 calculated from Equation (5) as $D1=V_{WFL}/V_{WFR}-V_{WRL}/V_{WRR}$. If the tire air pressure for the front-left road wheel 10FL drops, the difference D1 will increase since the speed $V_{WFL}$ of the front-left road wheel 10FL is greater than the speed of each of the other road wheels 10FR, 10RL and 10RR resulting from the change of the load exerted on the corresponding road wheel. Similarly, if the tire air pressure for the rear-right road wheel 10RR drops, the difference D1 will increase. On the other had, if the tire air pressure for the front-right or rear-left road wheel 10FR or 10RL drops, the difference D1 will decrease. Since the speed $V_{WFL}$ of the front-left road wheel 10FL is greater than the speed of each of the other road wheels 10FR, 10RL and 10RR resulting from the change of the load exerted on the corresponding road wheel. This was proven through our experiments. The experiment results are shown in FIG. 7A.

The difference D1 is at an initial value $D_{100}$ when all of the four road wheels have a normal tire air pressure. If the average difference aveD1, that is, the difference of the initial value $D_{100}$ form the average cumulative value $(\Sigma D1/n_0)$, is a positive value greater than the upper limit $D_{IFO}$ of a dead zone, it means a drop in the tire air pressure for the front-left or rear-right road wheel 10FL or 10RR. If the average difference aveD1 is a negative value less than the lower limit $-D_{IFO}$ of the dead zone, it means a drop in the tire air pressure for the front-right or rear-left road wheel 10FR or 10RL. According to the program of FIG. 3a, it is specified that either of the front-right or rear-left road wheel 10FR or 10RL has a dropped tire air pressure when the average difference aveD1 is a negative value less than the lower limit $-D_{IFO}$ of the dead zone (point 144). It is specified that either of the front-right or rear-left road wheel 10FR or 10RL has a dropped tire air pressure when the average difference aveD1 is a positive value less than the upper limit $D_{IFO}$ of the dead zone (point 168). In other cases, that is, the average difference aveD1 is within the dead zone, the caution control signals $F_{iC}$ is maintained at its low or logic "0" level and the warning control signal $F_{iW}$ is maintained at its low or logic "0" level (at point 192) to indicate that the tire air pressures for all of the four road wheels are substantially at the normal value.

Figure 7A:
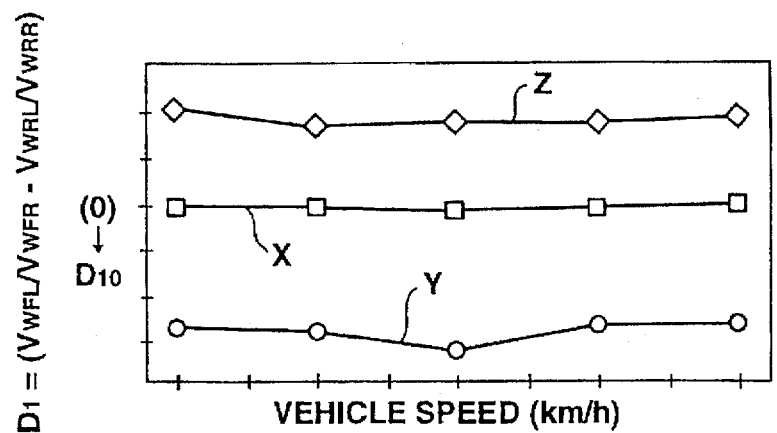
FIG. 7A is a graph showing the difference D1 plotted with respect to given vehicle speeds for different tire air pressure conditions.

FIG. 7A illustrates the results of a series of tests. The difference D1 of the rear-left and rear-right wheel speed ratio from the front-left and front-right wheel speed ratio is plotted with respect to given vehicle speeds. Curve X illustrates the case where all of the four road wheels have a normal tire air pressure. Curve Y illustrates the case where the rear-left 10RL (or front-right road wheel 10FL) has a dropped tire air pressure. Curve Z illustrates the case where the front-left road wheel 10FL (or rear-right road wheel 10RR) has a dropped tire air pressure. It is apparent from FIG. 7A that the difference D1 changes in a different manner when the tire air pressure for one of the front road wheels drops than when the tire air pressure for one of the rear road wheels drops even for the same rate of change of the tire air pressure. This is stemmed mainly by the distribution of loads exerted on the front and rear road wheels. Because of this tendency, according to the invention, it is confirmed that the average value aveD1 is a negative value less than the predetermined value $-D_{IRO}$ (point 158) upon the determination as to whether or not the tire air pressure for the rear-left road wheel 10RL is dropped and it is confirmed that the average value aveD1 is a positive value greater than the predetermined value $D_{IRO}$ (point 182) upon the determination as to whether or not the tire air pressure for the rear-right road wheel 10RR is dropped.

Figure 3B:
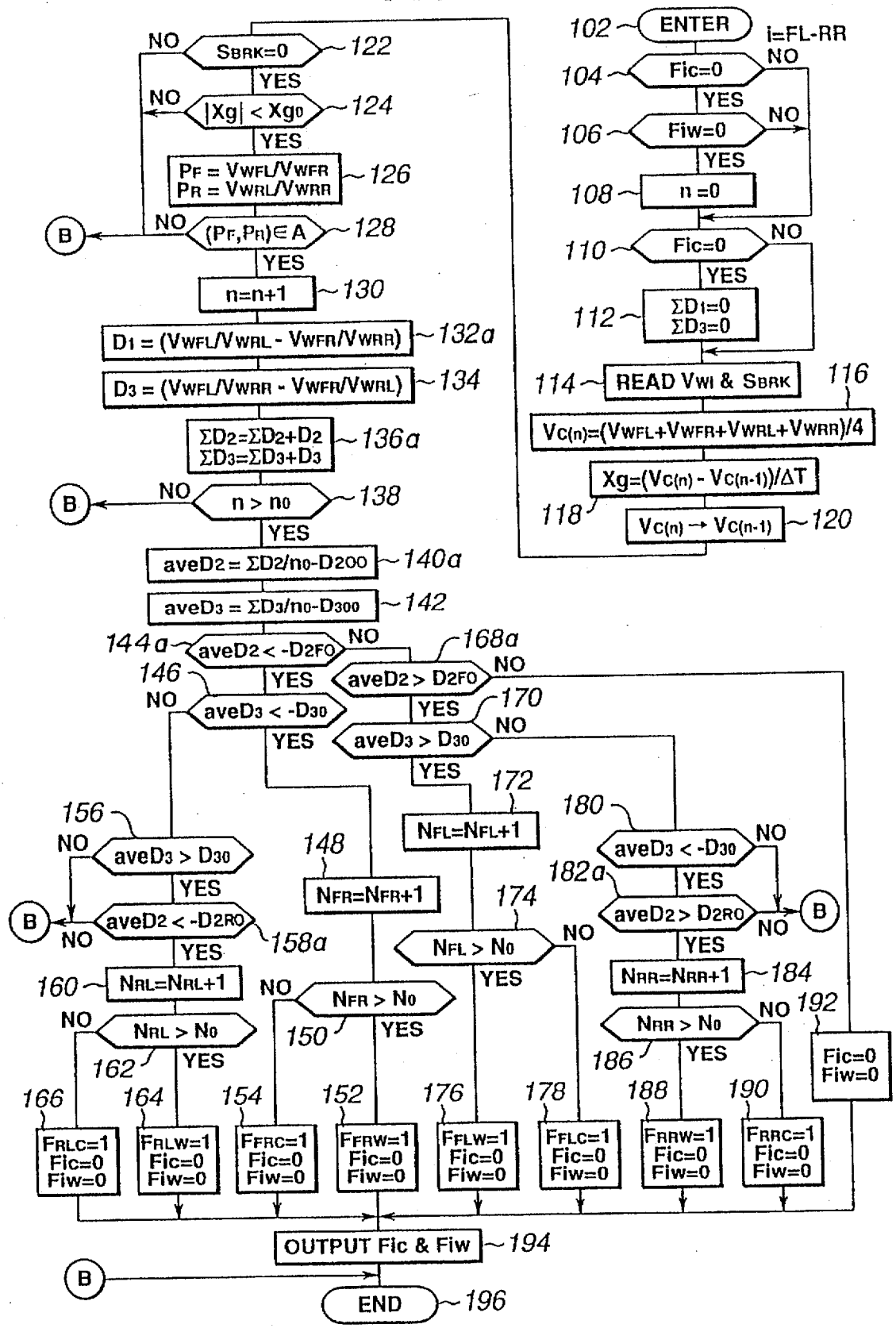
FIG. 3b is a flow diagram illustrating a second programming of the digital computer and it is used to produce the caution or warning control signals.

It is to be understood that the difference D1 of the rear-left and rear-right wheel speed ratio from the front-left and front-right wheel speed ratio may be replaced with the difference D2 represented as (see FIG. 3b)

$$D2=V_{WFL}/V_{WRL}-V_{WFR}/V_{WRR} \quad (11)$$

Figure 7B:
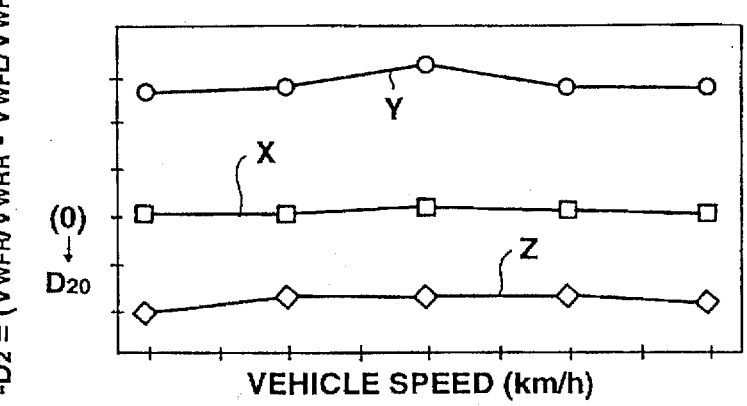
FIG. 7B is a graph showing the negative value −D2 of the difference D2 plotted with respect to given vehicle speeds for different tire air pressure conditions.

It the tire air pressure for the front-left road wheel 10FL drops, the difference D2 will increase. Similarly, if the tire air pressure for the rear-right road wheel 10RR drops, the difference D2 will increase. On the other hand, if the tire air pressure for the front-right or rear-left road wheel 10FR or 10RL drops, the difference D2 will decrease. This was proven through our experiments. The experiment results are shown in FIG. 7B. The negative value –D2 of the difference D2 is plotted with respect to given vehicle speeds. Curve X illustrates the case where all the four road wheels have a normal tire air pressure. Curve Y illustrates the case where the rear-left 10RL (or front-right road wheel 10FL) has a dropped tire air pressure. Curve Z illustrates the case where the front-left road wheel 10FL (or rear-right road wheel 10RR) has a dropped tire air pressure.

The difference D2 is at an initial value $D_{200}$ when all of the four road wheels have a normal tire air pressure. If the average difference aveD2, that is, the difference of the initial value $D_{200}$ from the average cumulative value $(\Sigma D2/n_0)$, is a positive value greater than the upper limit $D_{IFO}$ of a dead zone, it means a drop in the tire air pressure for the front-left or rear-right road wheel 10FL or 10RR. If the average difference aveD2 is a negative value less than the lower limit $-D_{IFO}$ of the dead zone, it means a drop in the tire air pressure for the front-right or rear-left road wheel 10FR or 10RL.

Figure 7C:
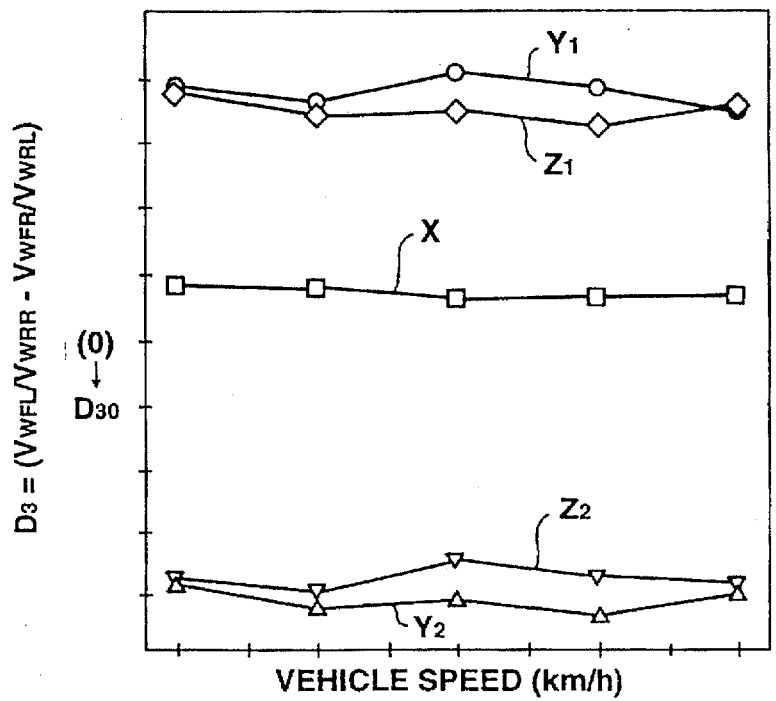
FIG. 7C is a graph showing the difference D3 plotted with respect to given vehicle speeds for different tire air pressure conditions.

Description is made to the difference D3 calculated from Equation (6) as $D3=V_{WFL}/V_{WRR}-V_{WFR}/V_{WRL}$. If the tire air pressure for the front-left road wheel 10FL drops the difference D3 will increase. Similarly, if the tire air pressure for the rear-left road wheel 10RL drops, the difference D3 will increase. On the other hand, if the tire air pressure for the front-right or rear-right road wheel 10FR or 10RR drops, the difference D3 will decrease. This was proven through our experiments. The experiment results are shown in FIG. 7C. The difference D3 is plotted with respect to given vehicle speeds. Curve X illustrates the case where all of the four road wheels have a normal tire air pressure. Curve Y1 illustrates the case where the rear-left 10RL has a dropped tire air pressure. Curve Y2 illustrates the case where the rear-right road wheel 10RR has a dropped tire air pressure. Curve Z1 illustrates the case where the front-left road wheel 10FL has a dropped tire air pressure. Curve Z2 illustrates the case where the front-right road wheel 10FR has a dropped tire air pressure.

The difference D3 is at an initial value $D_{300}$ when all of the four road wheels have a normal tire air pressure. If the average difference aveD3, that is, the difference of the initial value $D_{300}$ form the average cumulative value $(\Sigma D3/n_0)$, is a positive value greater than the upper limit $D_{30}$ of a dead zone, it means a drop in the tire air pressure for the front-left or rear-left road wheel 10FL or 10RL. If the average difference aveD3 is a negative value less than the lower limit $-D_{30}$ of the dead zone, it means a drop in the tire air pressure for the front-right or rear-right road wheel 10FR or 10RR. According to the program of FIG. 3, it is specified that the front-right road wheel 10FR has a dropped tire air pressure if the average difference aveD3 is a negative value less than the lower limit 'D$_{30}$ of the dead zone (point 146). Otherwise, it is specified that the rear-left road wheel 10RL has a dropped tire air pressure. It is also specified that the front-left road wheel 10FL has a dropped tire air pressure if the average difference aveD3 is a positive value greater than the upper limit D$_{30}$ of the dead zone (point 170). Otherwise, it is specified that the rear-right road wheel 10RR has a dropped tire air pressure. In other cases, that is, the average difference aveD3 is within the dead zone, the program proceeds to the end point 196.

Each time a road wheel have a dropped tire air pressure is specified, the caution counter N$_i$ (i=FL, FR, RL and RR) for the specified road wheel is incremented (point 148, 160, 172 or 184). When the count N$_i$ of the caution counter is less than a predetermined value N$_0$, the corresponding caution control signal F$_{iC}$ is changed to its high or logic "1" level (point 154, 166, 178 or 190). When the count N$_i$ of the caution counter exceeds the predetermined value N$_0$, the corresponding warning control signal F$_{iW}$ is changed to its high or logic "1" level (point 152, 164, 176 or 188). The caution control signals F$_{iC}$ or the warning control signal F$_{iW}$ are outputted to the corresponding one of the drive circuits 24FL, 24FR, 24RL and 24RR (point 194). The drive circuit, which receives the caution control signal F$_{iC}$ having the high and logic "1" level, produces a drive signal LD$_{FL}$, LD$_{FR}$, LD$_{RL}$ or LD$_{RR}$ to cause the corresponding one of the lamps 35FL, 35FR, 35RL and 35RR provided on the instrument panel to flash. The drive circuit, which receives the warning control signals F$_{iW}$ having the high and logic "1" level, produces a drive signal LD$_{FL}$, LD$_{FR}$, LD$_{RL\ or\ LDRR}$ to cause the corresponding one of the lamps 35FL, 35FR, 35RL and 35RR provided on the instrument panel to go on so as to provide a visible indication that the specified road wheel has a dropped tire air pressure.

Figure 8A:
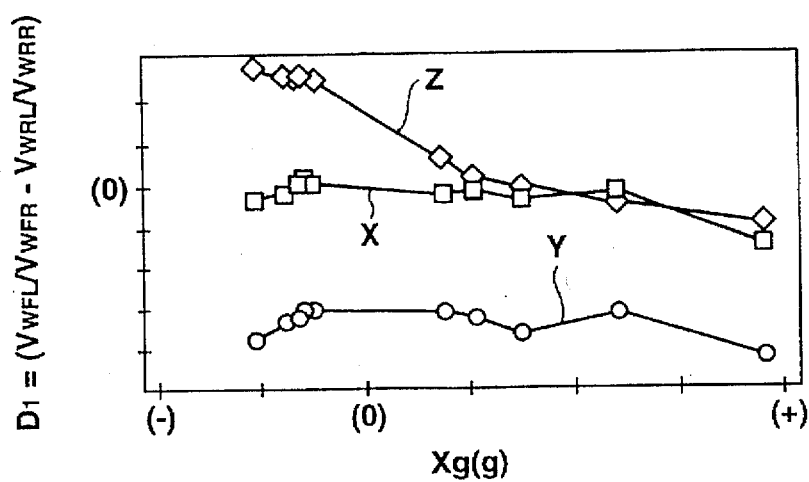
FIG. 8A is a graph showing the difference D1 plotted with respect to given vehicle longitudinal accelerations for different tire air pressure conditions.

Description will be made to the influence of the vehicle longitudinal acceleration Xg on the characteristic of the road wheel having a dropped tire air pressure. With the differential limit device provided between the left and right driving road wheels, the difference between the angular speeds of rotation of the driving road wheels decreases as the driving forces applied to the driving road wheels increase and vice versa when the driving forces decrease. The magnitudes of the driving forces are reflected on the vehicle longitudinal acceleration. FIG. 8A illustrates the results of a series of tests conducted while changing the driving forces applied to the driving road wheels 10FL and 10FR having a differential limit device provided therebetween. The difference D1 of the rear-left and rear-right wheel speed ratio from the front-left and front-right wheel speed ratio is plotted with respect to given vehicle longitudinal accelerations. Curve X illustrates the case where all of the four road wheels have a normal tire air pressure. Curve Y illustrates the case where the rear-left road wheel 10RL has a dropped tire air pressure. Curve Z illustrates the case where the front-left road wheel 10FL has a dropped tire air pressure. When the front-left road wheel 10FL has a dropped tire air pressure to increase the driving force applied to the front-left road wheel 10FL, the front-left road wheel speed V$_{WFL}$ increases to a great extent, because of the tire air pressure drop, and the front-right road wheel speed V$_{WFR}$ increases to a small extent as the vehicle longitudinal acceleration Xg increases. However, the differential limit device decreases the difference between the front-left and -right road wheel speeds V$_{WFL}$ and V$_{WFR}$. For this reason, the difference D1 decreases as the vehicle longitudinal acceleration Xg increases. When the vehicle longitudinal acceleration Xg exceeds a predetermined positive value, the relationship between the difference D1 obtained when all of the four road wheels have a normal tire air pressure and the difference D1 obtained when the front-left road wheel 10FL has a dropped tire air pressure is broken. In this range where the vehicle longitudinal acceleration Xg exceeds the positive value, therefore, it is impossible to make a judgement as to whether or not the front-left road wheel 10FL has a dropped tire air pressure based on the average value aveD1 even by setting the initial valueD$_{100}$ as small as possible. Since the road wheel speed change is not reflected on the rear-left road wheel speed V$_{WRL}$ even though the rear-left road wheel 10RL has a dropped tire air pressure, the relationship between the difference D1 obtained when the rear-left road wheel 10RL has a dropped tire air pressure and the difference D1 obtained when all of the four road wheels have a normal tire air pressure is unchanged regardless of the vehicle longitudinal accelerating Xg. However, the reference value, that is, the difference D1 obtained when all of the four road wheels have a normal tire air pressure is unstable because of gradual changes in the difference D1 with changes in the vehicle longitudinal acceleration Xg according to vehicle characteristics.

Figure 8B:
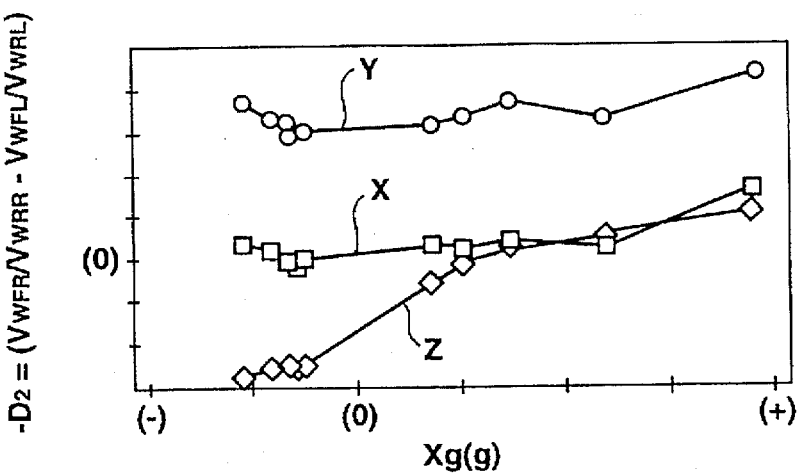
FIG. 8B is a graph showing the negative value −D2 of the difference D2 plotted with respect to given vehicle longitudinal accelerations for different tire air pressure conditions.

FIG. 8B illustrates the results of a series of similar tests. The difference D2 is plotted with respect to given vehicle longitudinal accelerations Xg. Curve X illustrates the case where all of the four road wheels have a normal tire air pressure. Curve Y illustrates the case where the rear-left road wheel 10RL has a dropped tire air pressure. Curve Z illustrates the case where the front-left road wheel 10FL has a dropped tire air pressure. The test results are substantially similar to the test results obtained for the difference D1 (see FIG. 8A).

Figure 8C:
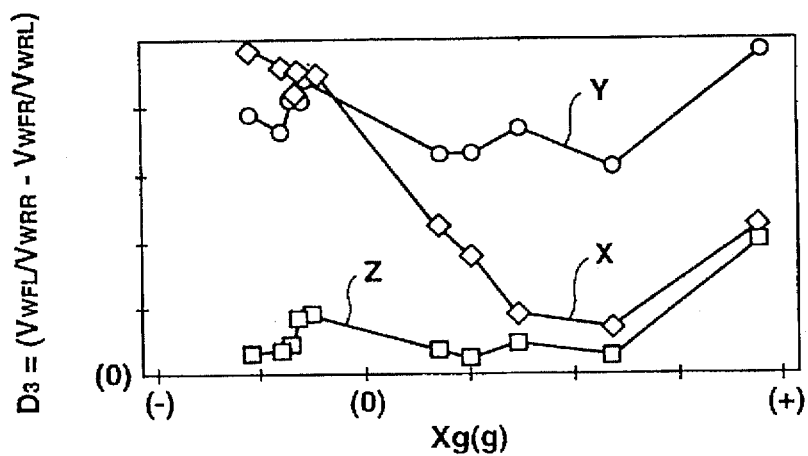
FIG. 8C is a graph showing the difference D3 plotted with respect to given vehicle longitudinal accelerations for different tire air pressure conditions.

FIG. 8C illustrates the results of a series of similar tests. The difference D3 is plotted with respect to given vehicle longitudinal accelerations Xg. Curve X illustrates the case where all of the four road wheels have a normal tire air pressure. Curve Y illustrates the case where the rear-left road wheel 10RL has a dropped tire air pressure. Curve Z illustrates the case where the front-left road wheel 10FL has a dropped tire air pressure. As can be seen from FIG. 8C, the difference D3 comes closer to the difference D3 obtained when all of the four road wheels have a normal tire air pressure in such a range where the vehicle longitudinal acceleration Xg is a negative value, that is, where the vehicle is decelerated. During steady vehicle deceleration except for intended decelerating operation through the wheel cylinders, therefore, a judgement can be made whether or not the rear-left road wheel 10RL has a dropped tire air pressure based on the average value aveD3 calculated from Equation (10).

With a vehicle having a differential limit device provided between its driving road wheels, it is desirable from the standpoint of detection accuracy to specify the road wheel having a dropped tire air pressure based on the use of the angular speeds of rotation of the road wheels (or road wheel speeds V$_{wi}$).

Although the invention has been described in connection with the vehicle longitudinal acceleration Xg calculated as a function of the differentiated values or differences of the wheel speeds (the speeds of rotation of the road wheels), it is to be understood that the vehicle longitudinal acceleration may be detected directly with the use of an acceleration sensor. However, such an acceleration sensor would represent a substantially greater cost. Although the invention has been described in connection with the average vehicle longitudinal acceleration Xg calculated, from Equations (1)

and (2), by differentiating the vehicle speed Vc calculated as an average road wheel speed, it is to be understood that the vehicle longitudinal acceleration may be calculated as a function of the average value of the road wheel accelerations calculated previously. It may be considered that an excessively great or small road wheel acceleration detected for a road wheel indicates slip of the road wheel. In this case, the vehicle longitudinal acceleration may be calculated without the use of the acceleration of rotation of the road wheel.

Although the invention has been described in connection with a tire air pressure drop detecting system employing a microcomputer for tire air pressure drop detection, it is to be understood that the tire air pressure drop detecting system may be arranged to include electronic circuits combined for the same purpose. Furthermore, the tire air pressure drop detecting system may share the road wheel speed sensors with the vehicle control systems such as an antiskid control system, a vehicle behavior control system or the like.

What is claimed is:

1. A system for use with an automotive vehicle supported on road wheels to detect a drop in a tire air pressure for each of the road wheels, comprising:

sensor means for detecting angular speeds of rotation of the respective road wheels;

means for producing a command signal when the vehicle is detected as operating substantially in a steady straight line driving condition, the detection being made based on the detected angular road wheel speeds in view of changes in loads exerted in the respective road wheels caused by a drop in a tire air pressure for a road wheel when the detected angular road wheel speeds establish a predetermined relationship; and means for initiating an operation to specify the road wheel having a dropped tire air pressure based on the detected angular road wheel speeds when the command signal is produced and for stopping the operation to specify the road wheel having a dropped tire air pressure based on the detected angular road wheel speeds when the command signal is not produced.

2. The system as claimed in claim 1, which further includes means for detecting a vehicle longitudinal acceleration, and wherein the command signal producing means includes means for producing the command signal based on the angular speeds of rotation of the respective road wheels detected when the detected vehicle longitudinal acceleration is substantially at zero.

3. The system as claimed in claim 2, wherein the vehicle longitudinal acceleration detecting means includes means for calculating the vehicle longitudinal acceleration based on a differentiated value for the detected angular speeds of rotation of the respective road wheels, the differentiated value being computer as a difference between the detected angular speeds of rotation of the respective road wheels at a first time and a second time, divided by a time unit corresponding to a difference between the first and second times.

4. The system as claimed in claim 2, wherein the vehicle longitudinal acceleration detecting means includes means for calculating the vehicle longitudinal acceleration based on a difference for the detected angular speeds of rotation of the respective road wheels.

5. A system for use with an automotive vehicle supported on front and rear pairs of road wheels to detect a drop in a tire air pressure for each of the road wheels, comprising:

sensor means for detecting angular speeds of rotation of the respective road wheels;

means for calculating a first ratio of the detected angular speeds of rotation of the front-left and -right road wheels;

means for calculating a second ratio of the detected angular speeds of rotation of the rear-left and -right road wheels;

means for producing a command signal when an operation point represented by a coordinate pair of the first and second ratios is in a predetermined range, the predetermined range having a first and second range, the first range expanding ±d with respect to a first locus of change of the second ratio obtained with changes in the first ratio when the vehicle is operating in a steady straight line driving condition, where d is a small width, the second range expanding ±d with respect to a second locus of change of the first ratio obtained with changes in the second ratio when the vehicle is operating in the steady straight line driving condition; and means responsive to the command signal for specifying the road wheel having a dropped tire air pressure based on the detected angular road wheel speeds.

6. The system as claimed in claim 5, which further includes means for detecting a vehicle longitudinal acceleration, and wherein the command signal producing means includes means for producing the command signal based on the angular speed of rotation of the respective road wheels detected when the detected vehicle longitudinal acceleration is substantially at zero.

7. The system as claimed in claim 5, wherein the vehicle longitudinal acceleration detecting means includes means for calculating the vehicle longitudinal acceleration based on a differentiated value for the detected angular speeds of rotation of the respective road wheels, the differentiated value being computer as a difference between the detected angular speeds of rotation of the respective road wheels at a first time and a second time, divided by a time unit corresponding to a difference between the first and second times.

8. The system as claimed in claim 6, wherein the means for detecting a vehicle longitudinal acceleration includes means for calculating the vehicle longitudinal acceleration based on a difference for the detected angular speeds of rotation of the respective road wheels.

9. The system as claimed in claim 6, where the road wheel specifying means includes:

means for calculating a first ratio $P_F$ of the detected angular speeds of rotation of the front-left and -right road wheels;

means for calculating a second ratio $P_R$ of the detected angular speeds of rotation of the rear-left and -right road wheels; and means for specifying the road wheel having a dropped tire air pressure according to a position of an operation point represented by a coordinate pairs ($P_F$, $P_R$) with respect to a reference point represented by the coordinate pair ($P_F$, $P_R$) obtained when the vehicle is operating in the steady straight line driving condition.

10. The system as claimed in claim 9, which further includes means for detecting a vehicle longitudinal acceleration, and wherein the command signal producing means includes means for producing the command signal based on the angular speeds of rotation of the respective road wheels detected when the detected vehicle longitudinal acceleration is substantially at zero.

11. The system as claimed in claim 10, wherein the vehicle longitudinal acceleration detecting means includes means for calculating the vehicle longitudinal acceleration based on a differentiated value for the detected angular speeds of rotation of the respective road wheels, the differentiated value being computed as a difference between the detected angular speed of rotation of the respective road wheels at a first time and a second time, divided by a time unit corresponding to a difference between the first and second times.

12. The system as claimed in claim 10, wherein the means for detecting a vehicle longitudinal acceleration includes means for calculating the vehicle longitudinal acceleration based on a difference for the detected angular speeds of rotation of the respective road wheels.

13. The system as claimed in claim 9, wherein the road wheel specifying means includes:
   means for calculating a first difference between the first and second ratios;
   means for calculating a third ratio of the detected angular speeds of rotation of the front-left and rear-right road wheels;
   means for calculating a fourth ratio of the detected angular speeds of rotation of the front-right and rear-left road wheels;
   means for calculating a second difference between the third and fourth ratios; and
   means for specifying the road wheel having a dropped tire air pressure based on a comparison of the first difference with a first predetermined value and a comparison of the second difference with a second predetermined value.

14. The system as claimed in claim 13, which further includes means for detecting a vehicle longitudinal acceleration, and wherein the command signal producing means includes means for producing the command signal based on the angular speeds of rotation of the respective road wheels detected when the detected vehicle longitudinal acceleration is substantially at zero.

15. The system as claimed in claim 14, wherein the vehicle longitudinal acceleration detecting means includes means for calculating the vehicle longitudinal acceleration based on a differentiated value for the detected angular speeds of rotation of the respective road wheels, the differentiated value being computed as a difference between the detected angular speeds of rotation of the respective road wheels at a first time and a second time, divided by a time unit corresponding to a difference between the first and second times.

16. The system as claimed in claim 14, wherein the means for detecting a vehicle longitudinal acceleration includes means for calculating the vehicle longitudinal acceleration based on a difference for the detected angular speeds of rotation of the respective road wheels.

17. The system as claimed in claim 9, wherein the road wheel specifying means includes:
   means for calculating a third ratio of the detected angular speeds of rotation of the front-left and rear-right road wheels;
   means for calculating a fourth ratio of the detected angular speeds of rotation of the front-right and rear-left road wheels;
   means for calculating a first difference between the third and fourth ratios;
   means for calculating a second difference between a fifth ratio of the detected angular speeds of the front-left and rear-left road wheels and a sixth ratio of the detected angular speeds of rotation of the front-right and rear-right road wheels; and
   means for specifying the road wheel having a dropped tire air pressure based on a comparison of the second difference with a second predetermined value.

18. The system as claimed in claim 17, which further includes means for detecting a vehicle longitudinal acceleration, and wherein the command signal producing means includes means for producing the command signal based on the angular speeds of rotation of the respective road wheels detected when the detected vehicle longitudinal acceleration is substantially at zero.

19. The system as claimed in claim 18, wherein the vehicle longitudinal acceleration detecting means includes means for calculating the vehicle longitudinal acceleration based on a differentiated value for the detected angular speeds of rotation of the respective road wheels, the differentiated value being computer as a difference between the detected angular speeds of rotation of the respective road wheels at a first time and a second time, divided by a time unit corresponding to a difference between the first and second times.

20. The system as claimed in claim 18, wherein the means for detecting a vehicle longitudinal acceleration includes means for calculating the vehicle longitudinal acceleration based on a difference for the detected angular speeds of rotation of the respective road wheels.

21. An automotive vehicle, comprising:
   a front-left road wheel with a tire;
   a front-right road wheel with a tire;
   a rear-left road wheel with a tire;
   a rear-right road wheel with a tire;
   a plurality of road wheel speed sensors for detecting angular speeds of rotation of said front-left, front-right, rear-left and rear-right wheels; and
   a control unit specifying one of said road wheels which is experiencing a drop in tire air pressure,
   where
   said control unit calculates a first wheel speed ratio ($P_F$) between said detected angular speed of rotation of said front-left road wheel ($V_{WFL}$) and said detected angular speed of rotation of said front-right road wheel ($V_{WFR}$) and a second wheel speed ratio ($P_R$) between said detected angular speed of rotation of said rear-left road wheel ($V_{WRL}$) and said detected angular speed of rotation of said rear-right road wheel ($V_{WRR}$);
   said control unit determines whether or not, in a Cartesian coordinate system having said first wheel speed ratio on a horizontal axis thereof and said second wheel speed ratio on a vertical axis thereof, and operation point expressed in said Cartesian coordinate system by said calculated first and second wheel speed ratios falls in one of a first range and a second range in said Cartesian coordinate system, said first range being in the form of a predetermined window about a first line (L1) intersecting a predetermined reference operation point (C), said first line reflecting a first predetermined amount of change of said second wheel speed ratio in a first direction, parallel to said vertical axis, away from said predetermined reference operation point for a unit amount of change of said first wheel speed ratio in a second direction, parallel to said horizontal axis, away from said reference operation point,
   said first direction being oriented leftwards viewing in said second direction,
   said second range being in the form of a predetermined window about a second line (L2) intersecting said reference operation point (C),
   said second line reflecting a second predetermined amount of change of said first wheel speed ratio in a third direction, parallel to said horizontal axis, away from said reference operation point for a unit amount of change of said second wheel speed ratio in a fourth direction, parallel to said vertical axis, away from said reference operation point, said third direction being oriented rightwards viewing in said fourth direction;

said control unit initiates execution of processing of said detected angular speeds of rotation of said front-left, front-right, rear-left and rear-right wheels to determine which one of said road wheels is experiencing a drop in tire air pressure when said control unit has determined that said operation point expressed in said Cartesian coordinate system by said calculated first and second wheel speed ratios falls in one of said first and second ranges in said Cartesian coordinate system, but otherwise terminates execution of processing of said detected angular speeds of rotation of said front-left, front-right, rear-left and rear-right wheels.

22. The automotive vehicle as claimed in claim 21, wherein said predetermined reference operation point (C) is expressed in said Cartesian coordinate system by said first speed and second speed ratios when the automotive vehicle drives a predetermined steady straight line with all of said tires of said road wheels normally inflated.

23. The automotive vehicle as claimed in claim 22, wherein said control unit determines that one of said road wheels is experiencing a drop in tire air pressure when said operation point expressed in said Cartesian coordinate system by said calculated first and second wheel speed ratios is shifted from said predetermined reference operation point (C) beyond a predetermined amount.

24. The automotive vehicle as claimed in claim 23, wherein said control unit determines which one of said road wheel is experiencing a drop in tire air pressure in response to a direction in which said operation point expressed in said Cartesian coordinate system by said calculated first and second wheel speed ratios is shifted from said reference operation point.

25. The automotive vehicle as claimed in claim 24, wherein, when said control unit has determined that said operation point expressed in said Cartesian coordinate system by said calculated first and second wheel speed ratios falls in one of said first and second ranges in said Cartesian coordinate system, said control unit calculates a first difference ($D_1$) between said calculated first speed ratio and said second wheel speed ratio, a third wheel speed ratio between said detected angular speed of rotation of said front-left road wheel ($V_{WFL}$) and said detected angular speed of rotation of said rear-right road wheel ($V_{WRR}$), a fourth wheel speed ratio between said detected angular speed of rotation of said front-rear road wheel ($V_{WFR}$) and said detected angular speed of rotation of said rear-left road wheel ($V_{WRL}$), and a second difference ($D_3$) between said calculated third wheel speed ratio and said calculated fourth wheel speed ratio, and said control unit calculates an average of said calculated first difference (ave$D_1$) and compares said average of said calculated first difference with at least one of a first set of predetermined reference values ($-D_{1FO}$, $D_{1FO}$) and determines whether or not one of said road wheels is experiencing a drop in tire air pressure in response to a result of comparison of said average of said calculated first difference (ave$D_1$) with said at least one of said first set of predetermined reference values ($-D_{1FO}$, $D_{1FO}$), and said control unit calculates an average of said calculated second difference (ave$D_3$) and compares said average of said calculated second difference (ave$D_3$) with at least one of a second set of reference values ($-D_{3O}$, $D_{3O}$) and determines, in response to said result of comparison of said average of said calculated first difference (ave$D_1$) with said at least one of said first set of predetermined reference values ($-D_{1FO}$, $D_{1FO}$) and a result of comparison of said average of said calculated second difference (ave$D_3$) with said at least one of said second set of reference values ($-D_{3O}$, $D_{3O}$), which one of said road wheels is experiencing a drop in tire air pressure.

26. The automotive vehicle as claimed in claim 24, wherein, when said control unit has determined that said operation point expressed in said Cartesian coordinate system by said calculated first and second wheel speed ratios falls in one of said first and second wheel ranges in said Cartesian coordinate system, said control unit calculates a third wheel speed ratio between said detected angular speed of rotation of said front-left road wheel ($V_{WFL}$) and said detected angular speed of rotation of said rear-left road wheel ($V_{WRL}$), a fourth wheel speed ratio between said detected angular speed of rotation of said front-right road wheel ($V_{WFR}$) and said detected angular speed of rotation of said rear-right road wheel ($V_{WRR}$), and a first difference ($D_2$) between said calculated third wheel speed ratio and said calculated fourth wheel speed ratio, said control unit calculates a fifth wheel speed ratio between said detected angular speed of rotation of said front-left road wheel ($V_{WFL}$) and said detected angular speed of rotation of said rear-right road wheel ($V_{WRR}$), a sixth wheel speed ratio between said detected angular speed of rotation of said front-rear road wheel ($V_{WFR}$) and said detected angular speed of rotation of said rear-left road wheel ($V_{WRL}$), and a second difference ($D_3$) between said calculated fifth wheel speed ratio and said calculated sixth wheel speed ratio, and said control unit determines in response to said calculated first and second differences which one of said road wheels is experiencing a drop in tire air pressure.

27. An automotive vehicle, comprising:

a front-left road wheel with a tire;

a front-right road wheel with a tire;

a rear-left road wheel with a tire;

a rear-right raod wheel with a tire;

a plurality of road wheel speed sensors for detecting angular speeds of rotation of said front-left, front-right, rear-left and rear-right wheels; and a control unit specifying one of said road wheels which is experiencing a drop in tire air pressure, wherein said control unit determines whether or not the automotive vehicle drives in a predetermined state;

said control unit calculates a first wheel speed ratio ($P_F$) between said detected angular speed of rotation of said front-left road wheel ($V_{WFL}$) and said detected angular speed of rotation of said front-right road wheel ($V_{WFR}$) and a second wheel speed ratio ($P_R$) between said detected angular speed of rotation of said rear-left road wheel ($V_{WRL}$) and said detected angular speed of rotation of said rear-right road wheel ($V_{WRR}$) when said control unit has determined that the automotive vehicle drives in said predetermined state;

said control unit determines whether or not, in a Cartesian coordinate system having said first wheel speed ratio on a horizontal axis thereof and said second wheel speed ratio on a vertical axis thereof, and operation point expressed in said Cartesian coordinate system by said calculated first and second wheel speed ratios falls in one of a first range and asecond range in said Cartesian coordinate system, said first range being in the form of a predetermined window about a first line (L1) intersecting a predetermined reference operation point (C) which is expressed in said Cartesian coordinate system by said first and second wheel speed ratios when the automotive vehicle drives in a predetermined steady straight line with said tires of said road wheels normally infleated, said first line reflecting a first predetermined amount of change of said second wheel speed ratio in a first direction, parallel to said vertical axis, away from said predetermined reference operation point for a unit amount of change of said first wheel speed ratio in a second direction, parallel to said horizontal axis, away from said reference operation point, said first direction being oriented leftwards viewing in said second direction, said second range being in the form of a predetermined window about a second line (L2) intersecting said reference operation point (C), said second line reflecting a second predetermined amount of change of said first wheel speed ratio in a third direction, parallel to said horizontal axis, away from said reference operation point for a unit amount of change of said second wheel speed ratio in a fourth direction, parallel to said vertical axis, away from said reference operation point, said third direction being oriented rightwards viewing in said fourth direction;

said control unit initiates execution of processing of said detected angular speeds of rotation of said front-left, front-right, rear-left, and rear-right wheels to determine which one of said road wheels is experiencing a drop in tire air pressure when said control unit has determined that said operation point expressed in said Cartesian coordinate system by said calculated first and second wheel speed ratios falls in one of said first and second ranges in said Cartesian coordinate system, but otherwise terminates execution of processing of said detected angular speeds of rotation of said front-left, front-right, rear-left and rear-right wheels.

28. The automotive vehicle as claimed in claim 27, wherein said control unit determines whether or not the automotive vehicle drives in said predetermined state in response to acceleration to which the automotive vehicle is subjected.

29. The automotive vehicle as claimed in claim 27, wherein said control unit determines whether or not the automotive vehicle drives in said predetermined state in response to acceleration to which the automotive vehicle is subjected and application of a brake pedal of the automotive vehicle.

30. The automotive vehicle as claimed in claim 27, wherein said control unit derives an amount of acceleration (Xg) to which the automotive vehicle is subjected out of variation in said detected angular speeds of rotation over a predetermined period of time, determines whether or not an absolute value of said derived amount of acceleration (|Xg|) is less than a predetermined value ($Xg_0$), and determines that the automotive vehicle drives in said predetermined state when said absolute value of said derived amount of acceleration (|Xg|) is less than said predetermined value ($Xg_0$).

31. The automotive vehicle as claimed in claim 27, further comprising a brake switch indicative of release of a brake pedal of the automotive vehicle.

32. The automotive vehicle as claimed in claim 31, wherein said control unit determines whether or not the brake pedal is released in response to an output of said brake switch, derives an amount of acceleration (Xg) to which the automotive vehicle is subjected out of variation in said detected angular speeds of rotation over a predetermined period of time, determines whether or not an absolute value of said derived amount of acceleration (|Xg|) is less than a predetermined value ($Xg_0$), and determines that the automotive vehicle drives in said predetermined state when said absolute value of said derived amount of acceleration (|Xg|) is less than said predetermined value ($Xg_0$) and the brake pedal is released.

33. A method of determining which one of tires of road wheels of an automotive vehicle is experiencing a drop in tire air pressure, the method comprising the steps of:

detecting an angular speed of rotation of a front-left road wheel;

detecting an angular speed of rotation of a front-right road wheel;

detecting an angular speed of rotation of a rear-left road wheel;

detecting an angular speed of rotation of a rear-right road wheel;

calculating a first-wheel speed ratio ($P_F$) between said detected angular speed of rotation of said front-left road wheel ($V_{WFL}$) and said detected angular speed of rotation of said front-right road wheel ($V_{WFR}$) and a second wheel speed ratio ($P_R$) between said detected angular speed of rotation of said rear-left road wheel ($V_{WRL}$) and said detected angular speed of rotation of said rear-right road wheel ($V_{WRR}$);

determining whether or not, in a Cartesian coordinate system having said first wheel speed ratio on a horizontal axis thereof and said second wheel speed ratio on a vertical axis thereof, an operation point expressed in said Cartesian coordinate system by said calculated first and second wheel speed ratios falls in one of a first range and a second range in said Cartesian coordinate system, said first range being in the form of a predetermined window about a first line (L1) intersecting a predetermined reference operation point (C) which is expressed in said Cartesian coordinate system by said first and second wheel speed ratios when the automotive vehicle drives in a predetermined steady straight line with said tires of said road wheels normally inflated, said first line reflecting a first predetermined amount of change of said second wheel speed ratio in a first direction, parallel to said vertical axis, away from said predetermined reference operation point for a unit amount of change of said first wheel speed ratio in a second direction, parallel to said horizontal axis, away from said reference operation point, said first direction being oriented leftwards viewing in said second direction, said second range being in the form of a predetermined window about a second (L2) intersecting said reference operation point (C), said second line reflecting a second predetermined amount of change of said first wheel speed ratio in a third direction, parallel to said horizontal axis, away from said reference operation point for a unit amount of change of said second wheel speed ratio in a fourth direction, parallel to said vertical axis, away from said reference operation point, said third direction being oriented rightwards viewing in said fourth direction;

initiating execution of processing of said detected angular speeds of rotation of said front-left, front-right, rear-left and rear-right wheels to determine which one of said road wheels is experiencing a drop in tire air pressure when it is determined that said operation point expressed in said Cartesian coordinate system by said calculated first and second wheel speed ratios falls in one of said first and second ranges in said Cartesian coordinate system; and terminating execution of processing of said detected angular speeds of rotation of said front-left, front-right, rear-left and rear-right wheels when it is determined that said operation point expressed in said Cartesian coordinate system by said calculated first and second wheel speed ratios fails to fall in one of said first and second ranges in said Cartesian coordinate system.

* * * * *